United States Patent [19]

Holmes

[11] 4,167,278
[45] Sep. 11, 1979

[54] MAIN FRAME CONSTRUCTION FOR VEHICLES

[75] Inventor: Terry M. Holmes, Schofield, Wis.

[73] Assignee: J. I. Case Company, Racine, Wis.

[21] Appl. No.: 858,743

[22] Filed: Dec. 8, 1977

[51] Int. Cl.² .............................................. B62D 21/00
[52] U.S. Cl. ....................................... 280/786; 296/180
[58] Field of Search ........................... 296/28 R, 28 F; 280/781–800; 180/89.1, 1 F, 64 R, 6.58

[56] References Cited

U.S. PATENT DOCUMENTS

| | | | |
|---|---|---|---|
| 2,115,931 | 5/1938 | Matthaei | 280/796 |
| 2,189,719 | 2/1940 | Wallace | 280/781 |
| 2,245,789 | 6/1941 | Klavik | 280/786 |
| 2,604,175 | 7/1952 | Burdick | 180/6.58 |
| 2,855,110 | 10/1958 | Prichard | 180/6.58 X |
| 3,237,959 | 3/1966 | Heyl | 280/786 |
| 3,513,997 | 5/1970 | Heyer | 280/781 X |
| 3,622,171 | 11/1971 | Gottschalk | 280/797 |

FOREIGN PATENT DOCUMENTS 501107  2/1939  United Kingdom ..................... 280/786

*Primary Examiner*—Philip Goodman
*Attorney, Agent, or Firm*—Dressler, Goldsmith, Clement, Gordon & Shore, Ltd.

[57] ABSTRACT

A main frame for a vehicle constructed from a minimum number of parts is disclosed herein. The frame includes a pair of spaced elongated rectangular flat plates that have opposite edges and opposite ends interconnected by reinforcing plates and have aligned openings intermediate opposite ends thereof. Further reinforcing plates are located between the elongated flat plates and surround each of the openings and the various plates are arranged so that localized stress concentration areas are substantially eliminated.

10 Claims, 4 Drawing Figures

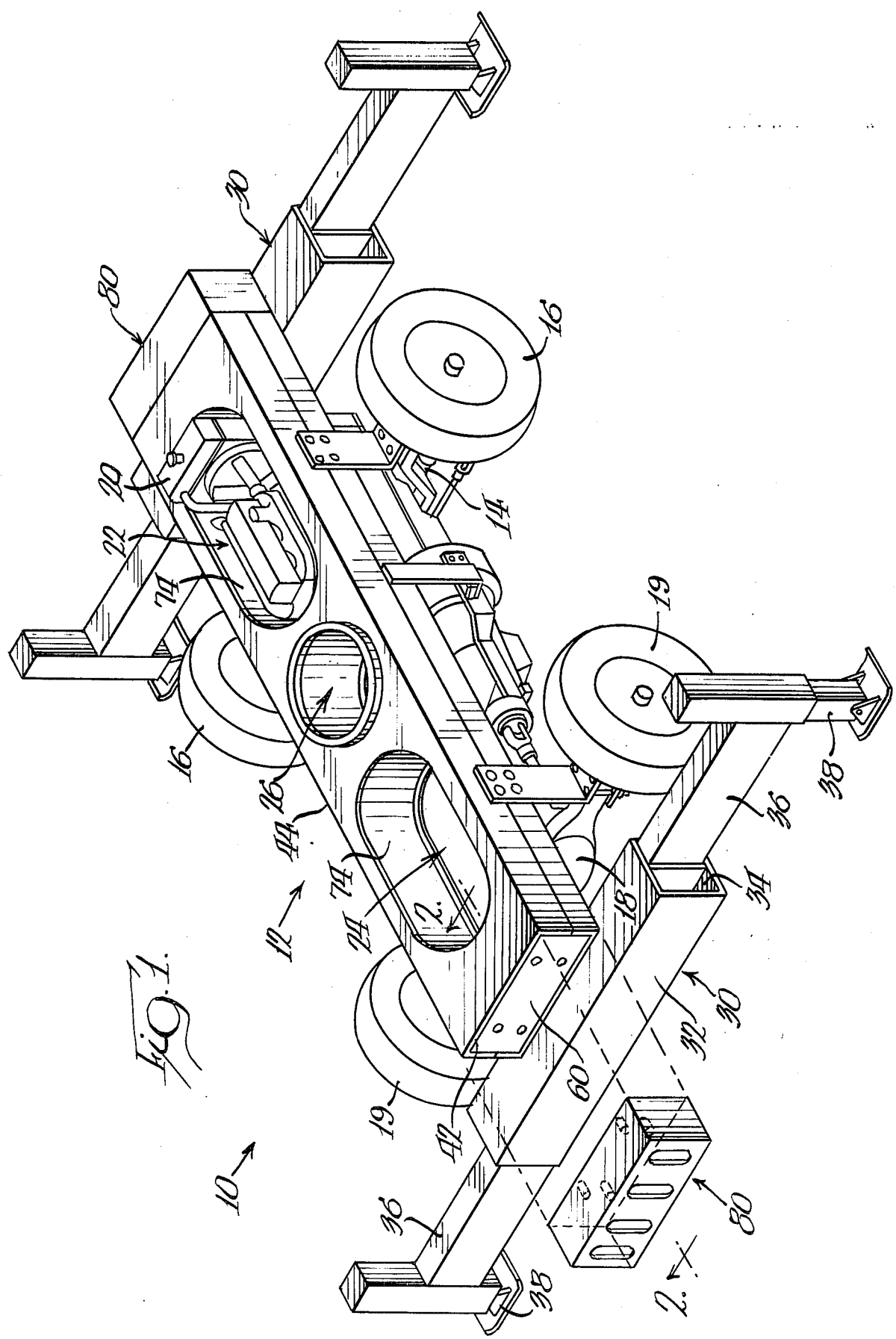

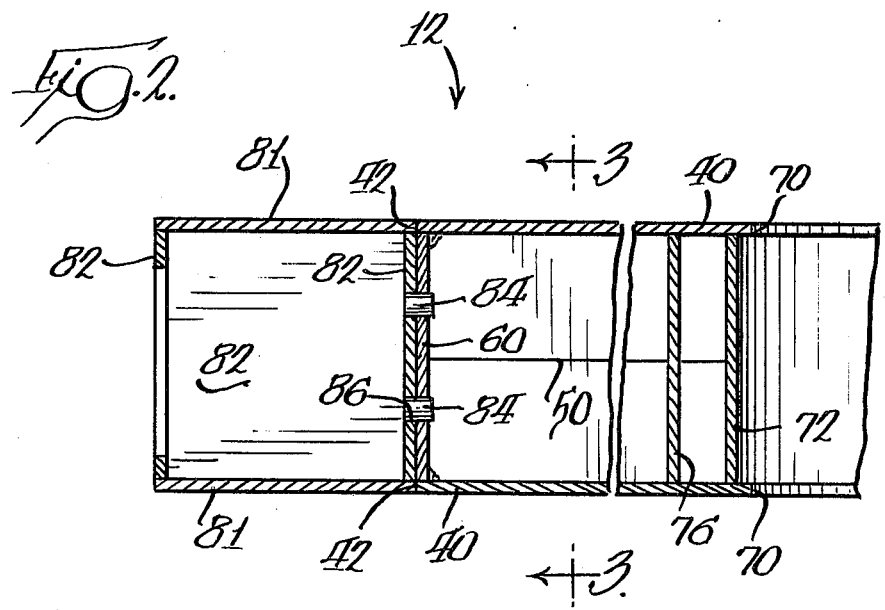
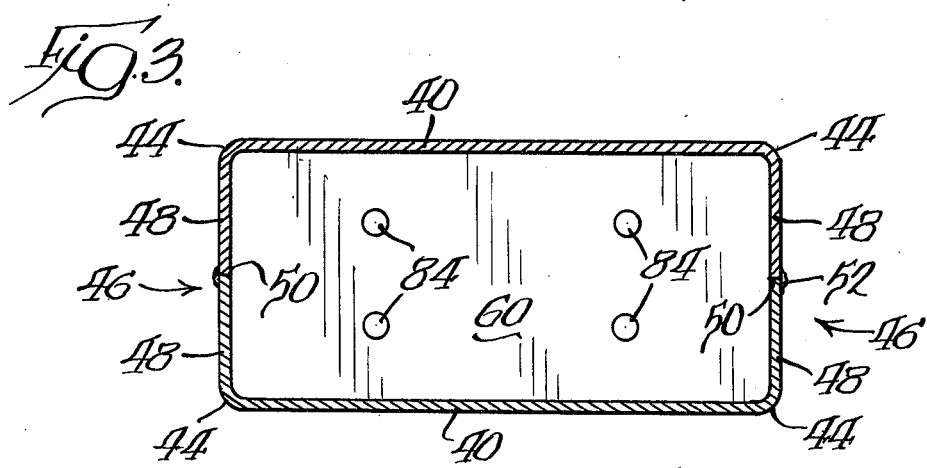
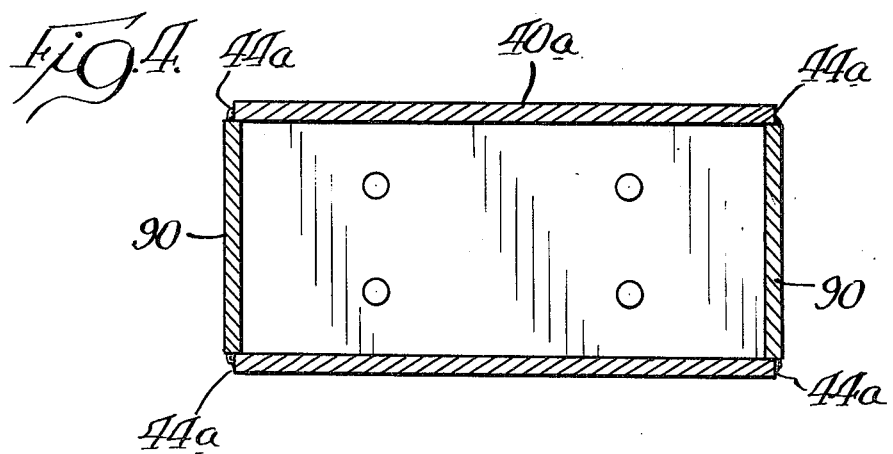

MAIN FRAME CONSTRUCTION FOR VEHICLES

BACKGROUND OF THE INVENTION

The present invention relates generally to frame structures for vehicles and more particularly to a frame structure for a vehicle that has a turntable rotatably supported on the frame.

Most present day commercial frame designs for vehicles include many associated parts or members of varying size and shape that are positioned with respect to each other in a predetermined nature and then are welded or bolted together. Such an arrangement requires a substantial amount of time for arranging the various parts or members in the proper orientation and then a considerable amount of welding for interconnecting the various parts.

While such an arrangement has generally been acceptable for most frame designs, in the area of mobile cranes or mobile excavators, significant problems have been encountered in designing a frame that is capable of supporting the heavy load without damaging the frame. For example, in mobile cranes, a turntable is rotatably supported on the center of the frame and a boom as well as a cab are supported on the turntable. Thus, the entire load supported on the boom produces a substantial load in a small area in the center of the frame which has been found to produce large stress concentration areas in most present day frame designs.

SUMMARY OF THE INVENTION

According to the present invention, a frame structure has been developed which optimizes the strength to weight ratio, substantially reduces the time required for assembling the frame structure and can be made from a minimum number of different pieces, which reduces the inventory of parts.

More specifically, the frame structure of the present invention consists of a pair of generally horizontal vertically spaced elongated flat plates that each have opposite edges and opposite ends with the respective plates having vertically aligned openings intermediate opposite edges and opposite ends. The opposite ends and opposite lateral edges are interconnected by reinforcing members and a rigid reinforcing element surrounds each pair of vertically aligned openings. All of the plates and members are welded to each other to define a permanent connection.

In one specific form of the invention, the upper and lower generally horizontal elongated rectangular plates have flanges integral with the respective lateral edges and the free edges of the flanges on the respective plates are in contiguous engagement with each other and are welded together to define the interconnection between the respective lateral edges of the vertically spaced plates. In another embodiment, the interconnection between the lateral edges of the flat rectangular plates includes a pair of vertical flat rectangular plates that respectively have their opposite edges welded to the lateral edges of the rectangular flat plates.

In both embodiments of the invention, the opposite ends are interconnected by flat plates and vertically extending reinforcing paltes surround each pair of vertically aligned openings and are connected to the upper and lower horizontal plates by welds adjacent the edges of the opening. The resultant main frame structure is therefore a generally rectangular hollow enclosed frame that has at least one opening located in the center thereof for supporting a turntable.

The versatility of the frame structure is further increased by providing extension pieces that can be attached to opposite ends of the hollow rectangular frame structure to increase the length thereof so that the basic frame structure can be utilized as a frame for vehicles of different sizes.

If further reinforcing is desired or necessary, baffles can also be located at desired locations between the upper and lower horizontal rectangular plates so that localized stress concentration areas can be eliminated.

BRIEF DESCRIPTION OF THE SEVERAL VIEWS OF THE DRAWINGS

FIG. 1 shows a perspective view of a frame structure constructed in accordance with the present invention and incorporated as a main frame for a vehicle;

FIG. 2 is an enlarged fragmentary sectional view, as viewed along line 2—2;

FIG. 3 is a vertical sectional view as viewed along line 3—3 of FIG. 2; and

FIG. 4 is a view similar to FIG. 3 showing a slightly modified form of the invention.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings shows selected portions of a vehicle generally designated by the reference numeral 10. Vehicle 10 includes a main frame 12 constructed according to the present invention. Main frame 12 has a front axle 14 connected directly thereto with front wheels 16 supported at opposite ends of the front axle 14 on vertical pivot axes (not shown) to perform the steering function for the vehicle. Likewise, a rear axle 18 is connected to the frame adjacent the opposite end thereof and rear wheels 19 are supported on opposite ends of the rear axle 18. It should be noted that while the terms front and rear have been used for purposes of description, the steering wheels 16 could readily be designed to be at the opposite end of the vehicle.

Vehicle 10 also includes an engine 20 which is located in an engine compartment or space 22 at one end of the vehicle, and a transmission (not shown) located in a second compartment or space 24 adjacent the opposite end of the vehicle. The particular frame construction illustrated in FIG. 1 is specifically designed for supporting a turntable that is adapted to be rotated 360 degrees on frame 12 and for this purpose, frame 12 has a further central circular opening 26 that has its center centered on the intersection between the longitudinal center axis as well as the transverse center axis for frame 12.

Since the vehicle to which this invention is directed normally requires some type of stabilizing means for providing the necessary rigidity during operation of the implement supported thereon, outrigger means 30 are located at opposite ends of frame 12. In the illustrated embodiment, each outrigger means 30 includes a rectangular member 32 that defines two rectangular openings 34 each of which has a beam 36 telescoped therein with outriggers 38 supported on the outer ends of beams 36.

According to the present invention, main frame 12 is designed so that it can be constructed from a minimum number of different pieces thereby substantially reducing the inventory of stock materials that are necessary and also substantially reducing the amount of fitting that is necessary for assembling the various parts.

As illustrated in FIGS. 2 and 3, frame 12 includes upper and lower rectangular flat plates 40 of substantially identical size and configuration. Plates 40 extend parallel and are spaced from each other and each plate has opposite ends 42 with the opposite ends of respective plates 40 vertically aligned with each other as illustrated in FIG. 2. The respective upper and lower horizontal plates 40 also have opposite lateral edges 44 with the adjacent lateral edges of the respective plates interconnected by reinforcing means 46. In the embodiment illustrated in FIGS. 2 and 3, reinforcing means 46 includes flanges 48 extending perpendicular to plates 46 and respectively integral with respective lateral edges 44 of respective plates 40. The flanges 48 of the respective plates 40 extend towards each other and have their free edges 50 in contiguous extended engagement with each other with a permanent connection in the form of a weld 52 interconnecting the free edges of the respective flanges 48. Thus, two substantially C-shaped members of identical size and configuration can be interconnected with each other through two continuous welds to define a hollow rectangular member when viewed in cross section as illustrated in FIG. 3. In the assembled condition, the two C-shaped elongated members have flat central webs 40 spaced from and extending parallel to each other and a pair of flat legs 48 extending substantially perpendicular to the central web at lateral edges 44. The respective legs 48 have free edges in extended engagement with each other and are permanently connected by weld 52.

Main frame 12 also has a pair of end plates 60 which are inserted into the free opposite open ends of the hollow rectangular member defined by plates 40 and reinforcing means 46 and are again permanently secured to opposite ends of plates 40 and flanges 48 through a permanent connection such as a weld (not shown). With the construction so far described, a hollow rectangular rigid structure which includes upper and lower spaced parallel plates 40 having their entire peripheries permanently interconnected produces a hollow enclosed frame structure.

According to the primary aspect of the present invention, the frame structure so far described is specifically designed and reinforced so as to substantially eliminate localized stress concentration areas which tend to damage the frame structure during normal use of the vehicle. As indicated above, the frame structure illustrated in the enclosed drawings is specifically designed as a frame for a material handling implement that includes a turntable which is rotatably supported on top of the frame and has the material implement supported thereon. In order to reduce or eliminate the localized stress concentration areas in the frame developed by the load being supported on the turntable, the frame structure of the present invention incorporates specifically located reinforcing means that eliminates such localized stress concentration areas.

As illustrated in FIG. 3, the center opening means 26 is defined by a pair of vertically aligned non-rectangular openings 70 which are preferably circular and the centers of these openings are longitudinally and transversely centered with respect to upper and lower plates 40. A rigid element or reinforcing plate 72 surrounds the vertically spaced aligned openings 70 and extends between plates 40. The upper and lower edges of circular plate 72 are in contiguous extended engagement with the adjacent surfaces of plates 40 in close proximity to the peripheral edges of openings 70 and are permanently secured thereto as by welding.

To further reduce stress concentration areas at the center of the frame 12, compartments or spaces 22 and 24 are again non-rectangular and in the illustrated embodiment are oval in plan view as illustrated in FIG. 1. The respective vertically aligned openings in the respective vertical plates that define compartments 22 and 24 are again reinforced around the perimeter thereof by reinforcing members or plates 74 that extend between flat rectangular plates 40 and have their upper and lower edges in contiguous engagement with the adjacent surfaces of the plate.

With the structure so far described, the loads supported by the frame 12, which are concentrated around the perimeter of center opening 26 are distributed in a more uniform fashion to different areas of the entire frame 12 to eliminate or at least substantially reduce the possibility of developing localized stress concentration areas at corners of the frame structure.

It will be appreciated from the above description that the construction results in having the major part of the load adsorbed by the center circular vertical reinforcing plate or member 72 and this load is then distributed to different areas of the frame by the particular configuration, particularly the arcuate end portions of oval openings 22 and 24 which merge with the flat sidewalls of the oval compartments. Thus, in the areas where the maximum concentration of forces is developed, there are no sharp 90° angles in the reinforcing members, particularly plates 72 and 74. If additional distribution of the load forces to different areas of the main frame is desired, an additional reinforcing plate 76 may be positioned around and spaced from reinforcing plate or member 72 and may again be permanently secured or welded to adjacent surfaces of plates 40. Of course, additional reinforcing means or baffles (not shown) could readily be positioned at any other location and at any angle with respect to the circular vertical reinforcing plate 72 so that stresses in any given localized area may be distributed over a larger surface area of the main frame.

The basic frame unit 12 can be constructed from a minimum number of different pieces which substantially reduces the inventory problem. For example, the main frame without an additional baffle 76 would require two identical elongated members that are C-shaped in cross section, two identical end plates 60, two identical plates that are deformed to the oval configuration and one plate 72 that is deformed to the circular configuration. Furthermore, plates 60, 72 and 74 could be produced from the same stock material because they are all of equal width.

According to another aspect of the present invention, extension means 80 are designed to be attached to opposite ends of main frame 12 to increase the length of the frame. This unique feature allows for the basic frame unit 12 to be utilized for producing vehicles of different lengths. Each extension means 80 is identical in cross section to the cross-sectional configuration of main frame 12 and includes a plurality of plates. For example, extension means could include upper and lower plates 81 that are flat and rectangular and are connected at each of the edges by vertical plates 82. Alternatively, upper and lower plates 81 could have integral flanges at their opposite edges similar to that described in connection with plates 40 to define the vertical side reinforcing means and then it would only be necessary to have two plates 82 for enclosing opposite ends of the extension means.

The extension means could readily be attached to the end of main frame 12 through suitable connection means, such as pins 84 extending through openings 86. Of course, if additional reinforcing is desired between main frame 12 and extension means 80, the extension could be welded around the entire perimeter to the free end of main frame 12. If desired, extension means 80 of different lengths could be provided to further increase the versatility of frame 12.

A slightly modified form of the invention is illustrated in FIG. 4 and, since most of the members or elements are identical in construction only the differences between this embodiment and the embodiment illustrated in FIG. 3 will be described. The modified form of the invention incorporates separate flat rectangular plates 90 which are again substantially identical in size and configuration so as to eliminate any need for an inventory of two sets of parts. These plates 90 extend between opposed lateral edges 44a of plates 40a and are welded thereto.

As can be appreciated from the above description, the present invention provides a unique arrangement which substantially reduces the inventory necessary for producing a satisfactory frame structure that can be manufactured at a high productivity rate. The particular construction illustrated and described above, results in a frame structure that has a maximum strength to weight ratio and makes the best utilization of the material requiring the least amount of welding. Also, with the small member of different parts, the problem of accurately aligning the various components of the frame structure prior to welding is substantially reduced and for all practical purposes eliminated. Furthermore, in both embodiments of the invention, the particular construction and configuration of the various parts results in eliminating any sharp corners in the area where the maximum load is supported by the frame.

In certain instances, it may be desirable to replace vertical reinforcing plates 72 and 74 with flanges that are integral with the respective edges of the openings in plates 40 that define spaces 22, 24 and 26.

While the above frame construction has been specifically described in connection with a frame for a mobile crane, it will be appreciated that the same concept could be incorporated into other vehicles, such as, for example, mobile excavators that again have a turntable supported for rotation about a vertical axis and a material handling implement carried by the turntable. Also, the entire frame could be tapered from one end to the opposite end, if desired.

What is claimed is:

1. A main frame construction for a vehicle including first and second vertically spaced, generally horizontal, elongated plates each having spaced opposite lateral edges and opposite ends, said plates having a plurality of vertically aligned pairs of openings intermediate said opposite lateral edges and opposite ends, reinforcing means extending between and permanently connected to said plates, said reinforcing means including a rigid reinforcing plate extending between said plates and in extended engagement with adjacent surfaces of said elongated plates in close proximity to peripheral edges of each pair of vertically aligned openings, at least one pair of openings and adjacent reinforcing plate creating a space adapted to receive a drive component, and members respectively interconnecting said opposite lateral edges and opposite ends of said plates to produce a generally hollow frame construction for a vehicle.

2. A main frame construction as defined in claim 1, in which each elongated plate has flanges integral with opposite lateral edges with free edges of the flanges of the respective plates being permanently interconnected to define said members respectively interconnecting said opposite lateral edges.

3. A main frame construction as defined in claim 2, in which said reinforcing means includes flat plate means interconnecting opposite ends of said elongated plates.

4. A main frame construction as defined in claim 3, further including extension means extending from said opposite ends.

5. A main frame construction as defined in claim 1, in which said members each include a flat plate extending between the respective lateral edges of said plates and being permanently connected thereto.

6. A main frame construction as defined in claim 1, in which one pair of vertically aligned openings in said elongated plates is circular and centered with respect to said elongated plates.

7. A main frame construction as defined in claim 6, in which said elongated plates have two further pairs of openings respectively positioned between said circular openings and respective ends of said elongated plates and in which each of said further pair of openings have arcuate edges adjacent said circular openings.

8. A main frame construction as defined in claim 7, in which each of said further pairs of openings is generally oval in plan view.

9. A main frame construction for a vehicle comprising a pair of rectangular, flat plates of substantially identical configuration and size and being spaced from and extending parallel to each other, said plates each having opposite ends and opposite lateral edges aligned with each other with a plurality of pairs of aligned openings in the respective flat plates intermediate said ends and edges, a first pair of side plates substantially identical in size and configuration and respectively extending vertically between adjacent lateral edges of said flat plates and being permanently connected thereto, a second pair of end plates of substantially identical size and configuration, said end plates respectively extending between adjacent ends of said flat plates and being permanently secured thereto, and a further plate for each of said pair of aligned openings, each further plate surrounding a respective pair of aligned openings and being permanently secured to said flat plates respectively to define a hollow rectangular frame structure, at least one pair of openings and surrounding further plate creating a space adapted to receive a drive component for the vehicle.

10. A frame construction for a vehicle comprising a pair of substantially identical elongated members generally C-shaped in cross section with a flat central web and a pair of flat legs extending substantially perpendicular to said central web at lateral edges thereof, said legs of respective elongated members extending towards each other and having free edges in extended engagement with each other with a weld interconnecting said edges, said central webs having a plurality of pairs of aligned openings therein with one pair of openings being circular and centered with respect to said central webs, and a reinforcing plate surrounding each pair of aligned openings, said plates respectively extending perpendicular to said flat central webs and having opposite edges respectively welded to adjacent surfaces of said central webs to define a unitary frame construction, each pair of aligned openings and reinforcing plate defining a space adapted to receive a drive component for the vehicle.

* * * * *